United States Patent
Su et al.

(10) Patent No.: US 11,682,997 B2
(45) Date of Patent: Jun. 20, 2023

(54) ROTARY ELECTRIC MACHINE WITH SELECTABLE COIL CONTROL

(71) Applicant: Hitachi Astemo Americas, Inc., Harrodsburg, KY (US)

(72) Inventors: Zhiyi Su, Okemos, MI (US); Zifu Wang, Northville, MI (US); Subrata Kumar Kundu, Canton, MI (US)

(73) Assignee: HITACHI ASTEMO AMERICAS, INC., Harrodsburg, KY (US)

( * ) Notice: Subject to any disclaimer, the term of this patent is extended or adjusted under 35 U.S.C. 154(b) by 5 days.

(21) Appl. No.: 17/321,581

(22) Filed: May 17, 2021

(65) Prior Publication Data
US 2022/0368263 A1 Nov. 17, 2022

(51) Int. Cl.
*H02P 27/08* (2006.01)
*H02P 29/024* (2016.01)
*H02P 29/028* (2016.01)
*H02K 3/46* (2006.01)

(52) U.S. Cl.
CPC .......... *H02P 27/085* (2013.01); *H02P 29/027* (2013.01); *H02P 29/028* (2013.01); *H02K 3/46* (2013.01)

(58) Field of Classification Search
CPC .... H02P 27/085; H02P 29/027; H02P 29/028; H02K 3/46
See application file for complete search history.

(56) References Cited

U.S. PATENT DOCUMENTS

| | | | | |
|---|---|---|---|---|
| 6,831,430 B2* | 12/2004 | Edelson | ................. | H02K 3/28 318/400.14 |
| 7,196,488 B2* | 3/2007 | Matsubara | ........... | G05B 19/414 318/599 |
| 7,610,973 B2 | 11/2009 | Asao et al. | | |
| 8,749,192 B2* | 6/2014 | Li | ........................ | H02K 11/33 318/803 |
| 2004/0021437 A1* | 2/2004 | Maslov | ................. | H02K 21/22 318/400.01 |
| 2007/0284157 A1* | 12/2007 | Heller | ................ | H02K 11/0094 180/54.1 |
| 2010/0138127 A1* | 6/2010 | Boughtwood | ........ | B60L 50/52 310/195 |
| 2013/0313948 A1 | 11/2013 | Zucker | | |
| 2014/0191624 A1* | 7/2014 | Jahshan | ................ | H02K 11/20 310/68 B |
| 2015/0349679 A1 | 12/2015 | Rogers | | |

FOREIGN PATENT DOCUMENTS

WO 1994/14226 A1 6/1994

* cited by examiner

*Primary Examiner* — Rina I Duda
(74) *Attorney, Agent, or Firm* — Mattingly & Malur, PC

(57) ABSTRACT

In some examples, a rotary electric machine includes a stator having a plurality of stator coils arranged in a circular pattern around a central opening configured for receiving a rotor. The rotary electric machine further includes a respective dedicated inverter circuit associated with each respective stator coil. For instance, each respective inverter circuit may be configured to convert direct current power to alternating current power to provide to the respective stator coil.

17 Claims, 8 Drawing Sheets

ROTARY ELECTRIC MACHINE WITH SELECTABLE COIL CONTROL

BACKGROUND

Power distribution for a rotary electric machine, such as an electric motor and/or generator, may include multiple phases. For example, for a conventional three-phase electric motor, an inverter may transform direct current (DC) power from a battery into alternating current (AC) power that is supplied to three conductors of a three-phase stator with a phase difference of one third of a cycle between each of the three conductors. The three-phase AC power activates successive coils of the stator to produce a rotating magnetic field with a specified direction and speed. For example, the rotating magnetic field may be used to produce torque when coupled with a rotor having a permanent magnet to enable the rotary electric machine to serve as an electric motor. During regenerative braking, the rotary electric machine may serve as a generator, and the inverter may convert the AC power produced by the rotary electric machine to DC power that may be used to charge the battery.

The stator coils in such rotary electric machines may sometimes be subject to local winding faults, short circuits, or other failures that can degrade the torque and power output of a rotary electric machine. In some cases, a failure in a stator coil may cause overheating and/or failure of the entire rotary electric machine. In addition, rotary electric machines are often subject to eccentricities between the center of the stator and the center of rotation of the rotor, which can result in vibration, noise, harshness, and inconsistent torque. The above-discussed issues can affect the overall reliability and safety of electric vehicles and hybrid electric vehicles.

SUMMARY

Some implementations include arrangements and techniques for a rotary electric machine that includes a stator having a plurality of stator coils arranged in circular pattern around a central opening configured for receiving a rotor. The rotary electric machine further includes a respective dedicated inverter circuit associated with each respective stator coil. For instance, each respective inverter circuit may be configured to convert direct current power to alternating current power to provide to the respective stator coil.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
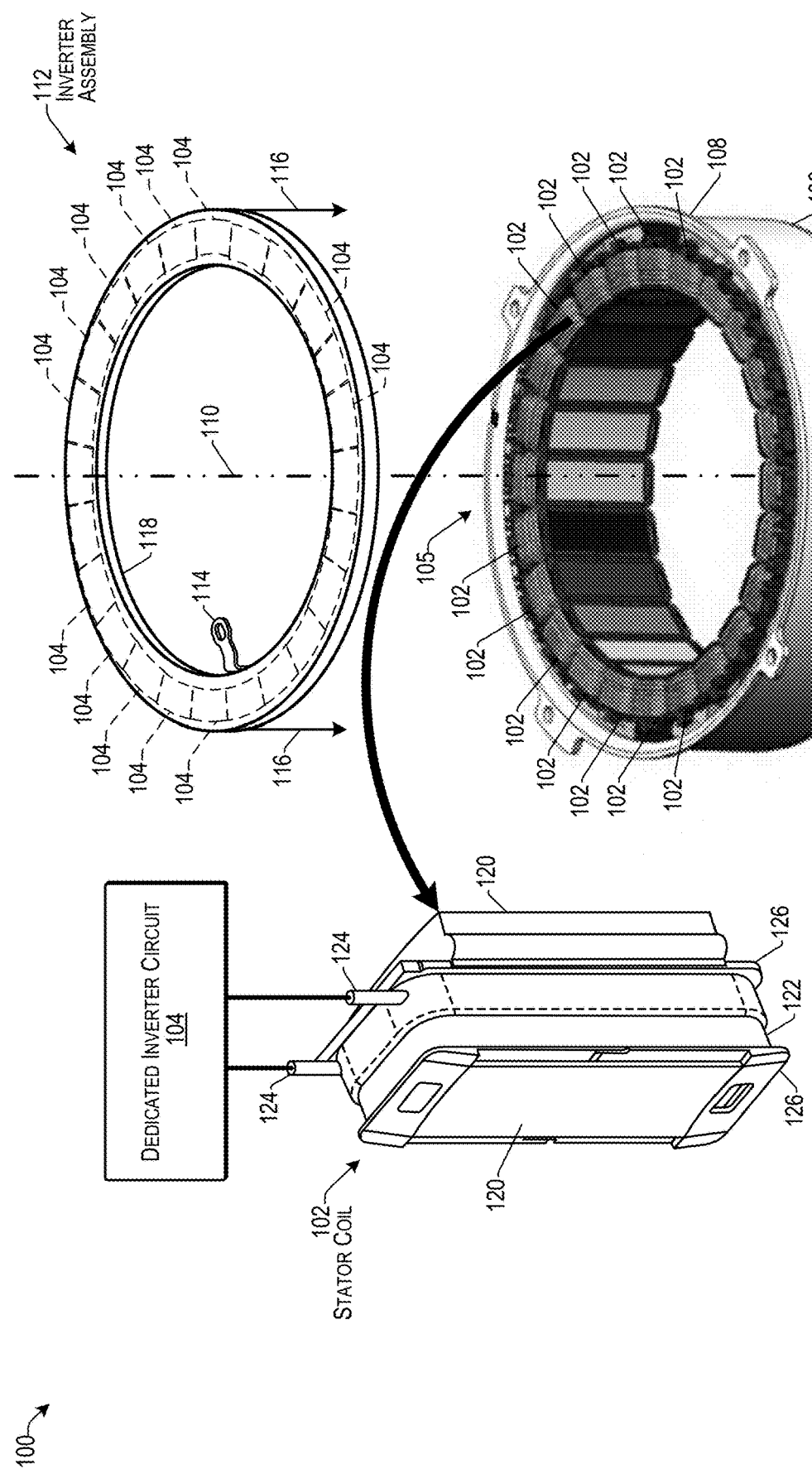
FIG. 1 illustrates a perspective view of an example stator and an enlarged perspective view of a stator coil having a dedicated inverter circuit according to some implementations.

The technology herein includes novel arrangements and techniques for sensing and controlling individual stator coils in a rotary electric machine to realize a higher degree of reliability and fault tolerance as compared with conventional rotary electric machines. In some examples herein, each coil of a stator of the rotary electric machine is individually connected to a dedicated inverter circuit and thus may be individually controlled via the dedicated inverter circuit for the respective stator coil. For instance, in the case of short-circuit faults inside an individual stator coil, implementations herein are able to identify the faulty stator coil and may contain the failure locally, such as by reducing the current supplied to the faulty stator coil. Furthermore, in the case of eccentricity faults, implementations herein may detect the eccentricity and may compensate for the eccentricity by applying an asymmetric current in one or more of the stator coils to counter the eccentricity at least partially.

In some implementations, the rotary electric machine with dedicated inverters may be used in a vehicle configuration that includes a high-voltage battery for providing power to the rotary electric machine. The rotary electric machine includes a stator with a plurality of wound stator coils and a plurality of dedicated inverter circuits connected to the plurality of stator coils, respectively, e.g., one dedicated inverter circuit per individual stator coil. Furthermore, a controller may provide gate switching signals to the respective inverter circuits such that the dedicated inverter circuits convert DC power from the battery into AC power and supply the AC power to their respective stator coils. The controller may be configured to operate the rotary electric machine as an electric motor within conventional three-phase conditions.

High voltage DC wiring may electrically connect the battery and the plurality of inverter circuits. Further, each coil of the stator may be individually connected to a dedicated inverter circuit, such as an inverter bridge, and therefore each stator coil may be individually controllable by the controller. This arrangement may significantly increase the reliability of the rotary electric machine. For instance, in the case of a short-circuit fault in an individual stator coil, the current to the faulty coil may be controlled individually by changing the control signal sent to the dedicated inverter circuit corresponding to the stator coil suffering from the short circuit. For example, the AC power supplied to the short circuiting coil may be constrained to a lower level to avoid excessive heating of the short circuiting stator coil. On contrary, in a conventional motor, excessive heating of the short circuiting stator coil may lead to a complete motor failure in the case of a short-circuit fault. As another example, in the case of an eccentricity fault, individually monitored coil current and voltage signals may be used to detect an eccentricity between the stator and the rotor. For instance, by applying asymmetric current in each coil, the controller is able to compensate for torque ripple and noise, vibration, and harshness (NVH) deterioration that may otherwise be caused by the eccentricity.

Some examples herein are described with reference to a rotary electric machine that may serve as a traction motor. Further, some examples may include a motor with a fractional slot concentrated winding. However, implementations herein are not limited to any particular configuration of the rotary electric machine. Additionally, in some examples, an inverter configuration may include more than three phases, such as a dedicated inverter for each stator coil, or in some cases, for a pair of stator coils, depending on the configuration of the rotary electric machine.

In some implementations, each dedicated inverter circuit may include a full bridge inverter circuit including four switches. Each full bridge inverter circuit may connect directly to the battery with a dedicated DC-link capacitor, and may be controlled by pulse-width modulation (PWM) signals generated by the controller to produce suitable output waveforms to drive the stator coils, e.g., typically sinusoidal currents. Further, a respective different dedicated full bridge inverter circuit may be connected to each respective stator coil in the stator. In other implementations, each dedicated inverter circuit may include a half bridge inverter circuit including two switches. For instance, the two switches may conduct alternately in turn and may be controlled by PWM signals generated by the controller.

For discussion purposes, some implementations are described in the environment of a three-phase rotary electric machine useful in vehicular applications. However, implementations herein are not limited to the particular examples provided, and may be extended to other service environments, other applications, other types of rotary electric machines, other inverter circuit configurations, and so forth, as will be apparent to those of skill in the art in light of the disclosure herein. In addition, while concentrated winding is described and illustrated in some examples in this application, the implementations herein may additionally or alternatively be used with distributed winding patterns or other types of winding, coil, and conductor arrangements. Accordingly, implementations herein are not limited to the particular winding, coil, and conductor configurations described in the examples.

FIG. 1 illustrates a perspective view of an example stator 100 and an enlarged perspective view of a stator coil 102 having a dedicated inverter circuit 104 according to some implementations. In this example, the stator 100 may be included in a rotary electric machine, such as a three-phase electric motor, although examples herein are not limited to such, as discussed above. For instance, the stator 100 may be of a concentrated winding type intended for use in restricted spaces. The stator 100 includes a plurality of the stator coils 102 positioned in a ring configuration around a central opening 105. The rotary electric machine may typically include a rotor (not shown in FIG. 1) that may include one or more permanent magnets that may be driven by an alternating current delivered to the stator 100 as is known in the art. The rotor may fit within the opening 105 of the stator 100 and, when positioned in the opening 105, may be surrounded by the plurality of stator coils 102.

The stator 100 includes a housing 106 that includes a flange 108 for mounting the stator 100 to a fixed support, fixture, mounting surface, cover, or the like (not shown). As is known in the art, when the rotor is installed in the stator 100, the rotor is rotatable relative to the stator 100 around a central axis of rotation, which typically corresponds to a central axis 110 of the stator 100, except in the case of certain eccentricities between the stator and the rotor, as discussed additionally below.

Electric current may be supplied to the stator 100 through an inverter assembly 112 that may be connectable to the stator coils 102. For instance, the inverter assembly 112 may supply the stator 100 with electric power to drive a vehicle (not shown) or to supplementarily assist an internal combustion engine (not shown). In addition, if the rotor is driven mechanically, such as when a vehicle is slowing down or in the case that the rotary electric machine is an alternator, the stator 100 may convert a portion of the kinetic energy to electric power, such as while assisting in slowing the vehicle.

In the illustrated example, the stator 100 may be provided with a three-phase alternating current (AC). For instance, the inverter assembly 112 may receive high-voltage direct current (DC) from a battery (not shown in FIG. 1) through connection to a power terminal 114 and the dedicated inverter circuits 104 may convert the DC power to AC power. The stator coils 102 may be connected with the inverter assembly 112 when the inverter assembly 112 is installed onto the stator coils 112 in the direction of arrows 116. In this example, the inverter assembly 112 includes a plurality of dedicated inverter circuits 104, such as one dedicated inverter circuit per stator coil 102. The inverter circuits 104 are disposed on a ring 118 in a circular arrangement that may match that of the stator coils 102. A controller may send control signals to individual ones of the inverter circuits 104 to cause the respective inverter circuits 104 to deliver AC current to respective stator coils 102 to cause each coil to be energized according to one of the three phases, i.e., a U-phase, a V-phase, or a W-phase, in a successive pattern, e.g., U, V, W, U, V, W, and so forth. The currents among the different phases U, V, and W are 120 electric degrees apart from each other.

As another example, the inverter assembly 112 and/or ring 118 may be omitted. For instance, each dedicated inverter circuit 104 may be connected directly to the end of a respective one of the stator coils 102. In some examples, a respective dedicated inverter circuit 104 may be attached individually to a respective stator coil 102. In other examples, the dedicated inverter circuits 104 may be assembled to some or all of the other dedicated inverter circuits 104 without the inclusion of the ring 118, and may be attached to the ends of the respective stator coils 102 either before or after assembly with each other. Further as another example, the stator coils 102 may each include a fixture on one end of the stator coil 102 for receiving and holding a respective dedicated inverter circuit 104. For instance, the dedicated inverter circuit 104 may be formed on a chip or circuit board that may be plugged into or otherwise connected to the fixture for connecting the dedicated inverter circuit 104 to the respective stator coil 102. Accordingly, implementations herein are not limited to any particular method or arrangement for assembling the dedicated inverter circuits 104 with the stator coils 102. Rather, numerous variations for connecting the dedicated inverter circuits 104 to the respective stator coils 102 will be apparent to those of skill in the art having the benefit of the disclosure herein.

The stator coils 102 may each include a length of a conductor, such as a wire, wound multiple times around a core segment 120 to form a conductor coil 122 that provides an electromagnetic effect when electric current passes through the conductor. The conductor may be insulated, such as with an enamel coating or other suitable insulator, to prevent short-circuiting between the windings of the conductor within the stator coil 102. The plurality of stator coils 102 may be pressed, shrunk fit, or otherwise adhered to the stator housing 106 to form the stator 100 as a hollow cylinder having the central opening 105. In the illustrated example, there are 24 stator coils 102 and 24 matching dedicated inverter circuits 104 disposed on the ring 118 of the inverter assembly 112. According to this arrangement, 8 stator coils 102 are designated for U-phase power, 8 stator coils 102 are designated for V-phase power, and 8 stator coils 102 are designated for W-phase power. Of course, more or fewer stator coils 102 and corresponding dedicated inverter circuits 104 may be used in other examples.

Each stator coil 102 may include a pair of end wires 124 for connecting to the inverter assembly 112. As mentioned above, the inverter assembly 112 includes a power terminal 114 for connecting to a cable, a wiring harness, a power source, a battery, or the like, for providing power to the dedicated inverters 104, and thereby to one of the wire ends 124 of each stator coil 102. The inverter assembly 112 may further include a neutral connector, such as a neutral bus ring (not shown in FIG. 1) that may be connected to a neutral line or otherwise connected to a ground plane (not shown in FIG. 1) such as through connection to the stator housing 106 or other connection. In the case of a vehicular application, the ground plane may correspond to a vehicle main ground such as the vehicle body, vehicle frame, vehicle chassis, or the like. In some examples, e.g., as discussed with respect to FIGS. 4 and 5 the other one of the end wires 124 of each stator coil not connected to the dedicated inverter circuit may connect to the neutral line. Alternatively, in other examples, e.g., as discussed with respect to FIGS. 2 and 3, the other one of the end wires 124 may also connect to a portion of the dedicated inverter circuit 104.

The core segment 120 of each stator coil 102 protrudes inward in the radial direction when the stator coil 102 is mounted in the stator housing 106 as discussed above. The core segment 120 in this example may be generally T-shaped in cross section when viewed from above, and may be configured to fit together with the core segments 120 of the other stator coils 102 when assembled into the housing 106. The use of stator coils 102 with segmented cores may be beneficial for enabling precise windings layout and high slot fill because the winding space is more easily accessible during winding.

The conductor may be wound around the core segment 120 via a bobbin 126 made of an insulating material to form the coil 122. The conductor may be of any suitable shape in cross section, such as circular, oval, rectangular, triangular, and so forth, as will be apparent to those of skill in the art having the benefit of the disclosure herein. The conductor ends 124 at the start and the end of the coil 122 may extend upward from the stator coil 102 and the insulation coating may be removed from the conductor ends 124 to enable an electrical connection. The conductor ends 124 may be connected to the respective dedicated inverter circuits 104 using any suitable technique, such as by insertion of the conductor ends 124 into conductive holes (not shown in FIG. 1) on the inverter assembly 112 or the like.

Figure 2:
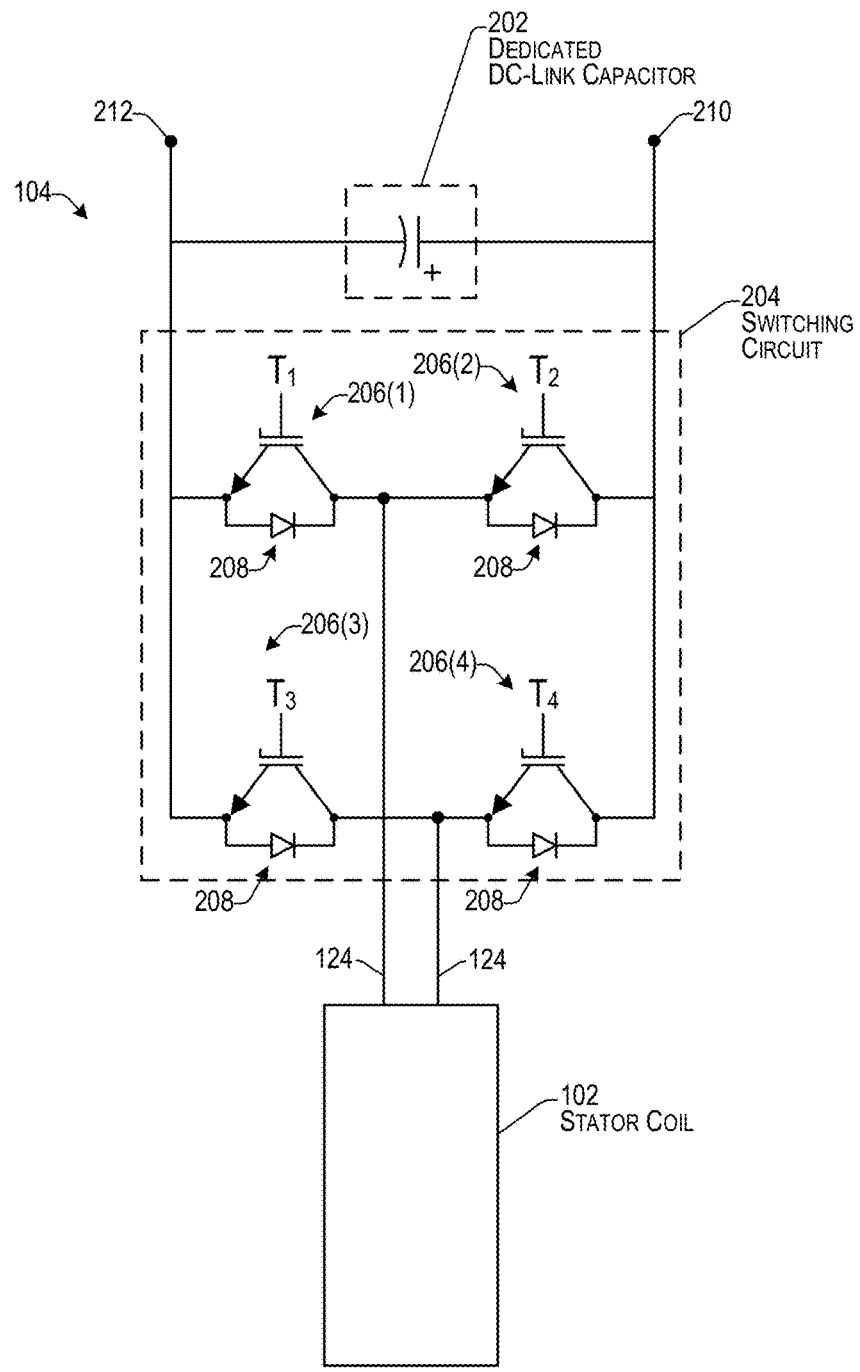
FIG. 2 illustrates an example configuration of a dedicated inverter circuit connected to a stator coil according to some implementations.

FIG. 2 illustrates an example configuration 200 of a dedicated inverter circuit 104 connected to a stator coil 102 according to some implementations. The dedicated inverter circuit 104 includes a DC-link capacitor 202 and a switching circuit 204. The DC-link capacitor 202 may serve as a fast-response energy-storage device. The DC-link capacitor 202 may help stabilize the DC voltage supplied to the switching circuit 204 and may linearize the current drawn from the battery, which may otherwise have high peaks that can reduce efficiency and battery life. The DC-link capacitor 202 may be positioned in close proximity to the switching circuit 204 to maximize the effectiveness of the DC-link capacitor 202.

The switching circuit 204 in this example forms a full-bridge inverter including four electronically controlled switches 206(1), 206(2), 206(3) and 206(4). The switches 206, in some cases, may be one of an (insulated-gate bipolar transistor) IGBT or a (metal-oxide-semiconductor field-effect transistor) MOSFET, either of which may be connected in parallel with a reversely connected diode 208, as is known in the art. A first side 210 of the dedicated inverter circuit 104 may connect to DC high-voltage received from a battery or other DC power source (not shown in FIG. 2). A second side 212 of the dedicated inverter circuit 104 may connect to a common return, a ground, or an otherwise neutral line (not shown in FIG. 2). In this example, a first one of the conductor ends 124 of the stator coil 102 connects to the switching circuit 204 between the first switch 206(1) and the second switch 206(2). In addition, a second one of the conductor ends 124 connects to the switching circuit 204 between the third switch 206(3) and the fourth switch 206(4).

The switches 206(1), 206(2), 206(3), and 206(4) of the switching circuit 204 may receive control signals T1, T2, T3, and T4, respectively. As one example, the switches may be controlled as pairs (206(1), 206(4)) and (206(2), 206(3)), and may be controlled by the signals T1, T4, and T2, T3, respectively, to conduct in turns. For instance, the control signals T1, T2, T3, and T4 may be pulse-width modulation (PWM) signals generated by a controller, as discussed additionally below, to generate appropriate output waveforms to the stator coil 102, such as for driving the rotor. For example, the waveform generated by the switching circuit 204 may be an imperfect or modified sine wave, such as a multiple step sinusoidal AC waveform. In other examples, the switching circuit 204 may generate a square wave, a perfect sine wave, or other AC waveform. Accordingly, implementations herein are not limited to any particular type of AC output for the dedicated inverter circuits 104.

Figure 3:
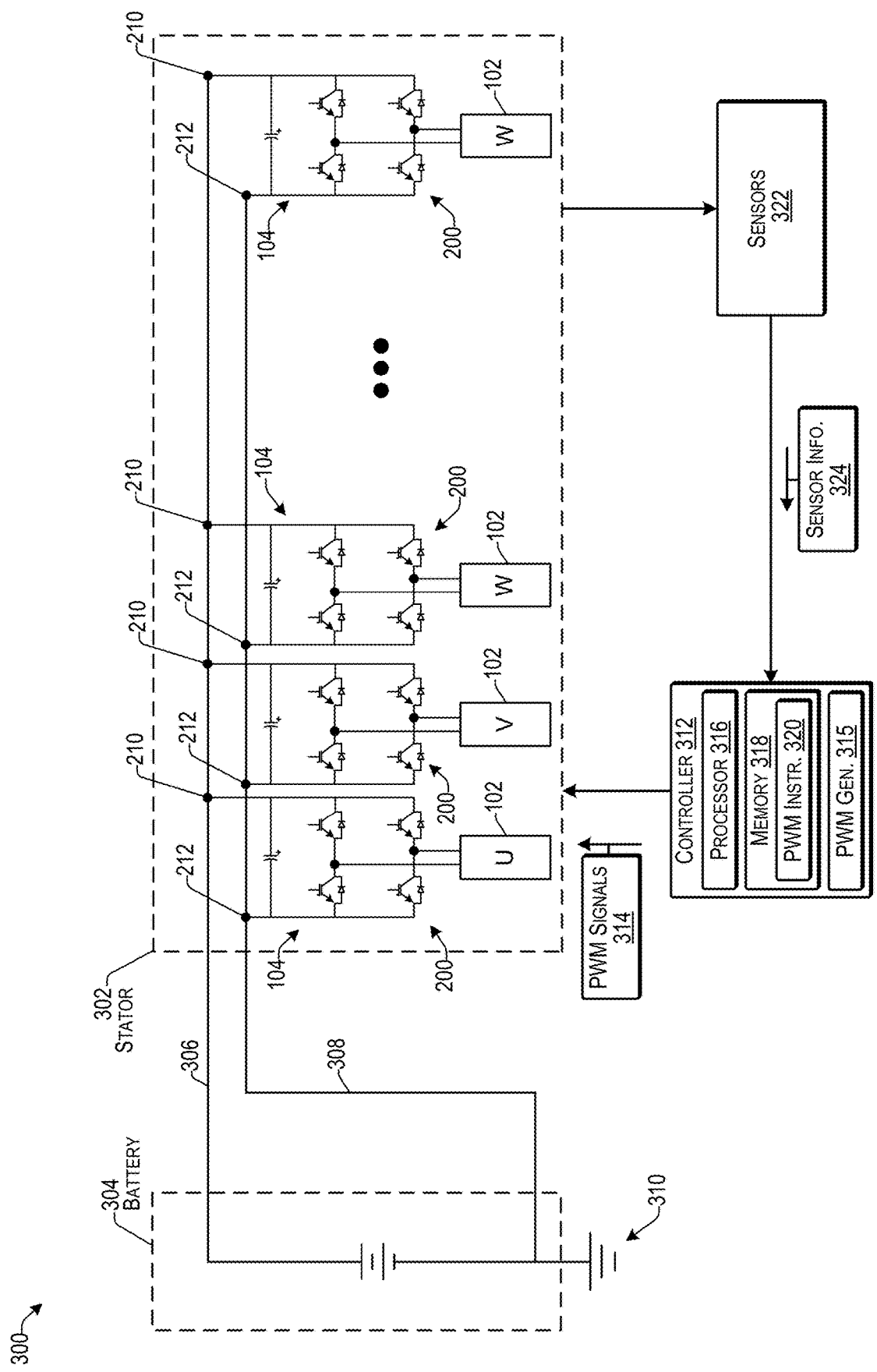
FIG. 3 illustrates an example circuit configuration of a stator including the dedicated inverter circuits of the configuration discussed above with respect to FIG. 2 according to some implementations.

FIG. 3 illustrates an example circuit configuration 300 of a stator 302 including the dedicated inverter circuits 104 of the configuration 200 discussed above with respect to FIG. 2 according to some implementations. In some examples, the stator 302 may correspond to the stator 100 discussed above with respect to FIG. 1. In the illustrated example, a battery 304 provides high voltage DC power through a line 306 to the first sides 210 of a plurality of the dedicated inverter circuits 104. In addition, a neutral line 308 connects to the second sides 212 of the plurality of dedicated inverter circuits 104 and returns to the battery 304 and/or a ground 310, which, in vehicular applications, may correspond to a vehicle ground plane and/or main ground such as the vehicle body, vehicle frame, vehicle chassis, or the like. Each of the dedicated inverter circuits 104 may receive the high voltage DC power through the line 306, and may convert the high voltage DC power to high voltage AC power that is provided to the respective stator coil 102 connected to the respective dedicated inverter circuit 104.

In addition, a controller 312 is connected to the stator 302 for providing control signals to the plurality of dedicated inverter circuits 104 as discussed above with respect to FIG.

2. As mentioned above, e.g., with respect to FIG. 2, the controller 312 may send PWM signals 314 to the individual switches or pairs of switches of the dedicated inverter circuits 104 to control the waveforms and the timing of the waveforms generated by the respective dedicated inverter circuits 104. The controller 312 may include one or more PWM generators 315, a processor 316, and a memory 318 that may store PWM instructions, such as a PWM algorithm, executable by the processor 316 for generating the PWM signals 314, such as based on an input received from a speed controller (not shown) or the like. As one example, the PWM instructions may be stored as firmware on the memory 318 and the processor 316 may execute the firmware for controlling the PWM generator 315. As another example, the processor 316 may be a logic circuit that is configured to perform the PWM instructions 320 for controlling the PWM generator(s) 315. Numerous other variations will be apparent to those of skill in the art. Accordingly, implementations herein are not limited to any particular configuration for the controller 312.

Based on the PWM instructions 320, the controller 312 may cause a first group of dedicated inverter circuits 104 to generate AC power according to a U phase, a second group of the dedicated inverter circuits 104 to generate AC power according to V phase, and a third group of the dedicated inverter circuits 104 to generate AC power according to a W phase. In some examples, there may be 24 total stator coils 102 and corresponding dedicated inverter circuits 104 such that there are eight dedicated inverter circuits 104 and stator coils 102 in each phase group. However, implementations herein are not limited to any particular number of stator coils 102 and corresponding inverter circuits 104.

In addition, sensors 322 may provide sensor information 324 to the controller 312. For example, the sensors 322 may include current sensors and/or voltage sensors for sensing an amount of current consumed by each stator coil 102. Additionally, in some cases, a heat sensor, such as thermocouple may be associated with each stator coil 102 for sensing a temperature of the respective stator coil 102. For example, in the case of a short circuit in one of the stator coils 102, the amount of current consumed by the shorted stator coil 102 may tend to increase above that of the other stator coils 102. In addition, the temperature of the shorted stator coil 102 may also increase above that of the other stator coils 102.

The sensors 322 may provide the sensor information 324 to the controller 312. Based on the sensor information 324, the PWM instructions 320 may cause the controller to change the PWM signals to the dedicated inverter circuit 104 for the shorted stator coil 102 to reduce the amount of current provided to the particular stator coil 102 and compensate for a reduction in resistance and inductance caused by the short in the particular stator coil 102. Accordingly, the rotary electric machine is able to remain functional and avoid overheating, even though the torque output may be reduced. This technique may contain the short circuit fault locally and enables the vehicle to continue to operate safely, such as for navigating to a maintenance facility to replace the faulty stator coil and/or the rotary electric machine containing the faulty stator coil. As discussed additionally below, eccentricity faults may also be compensated for.

Figure 4:
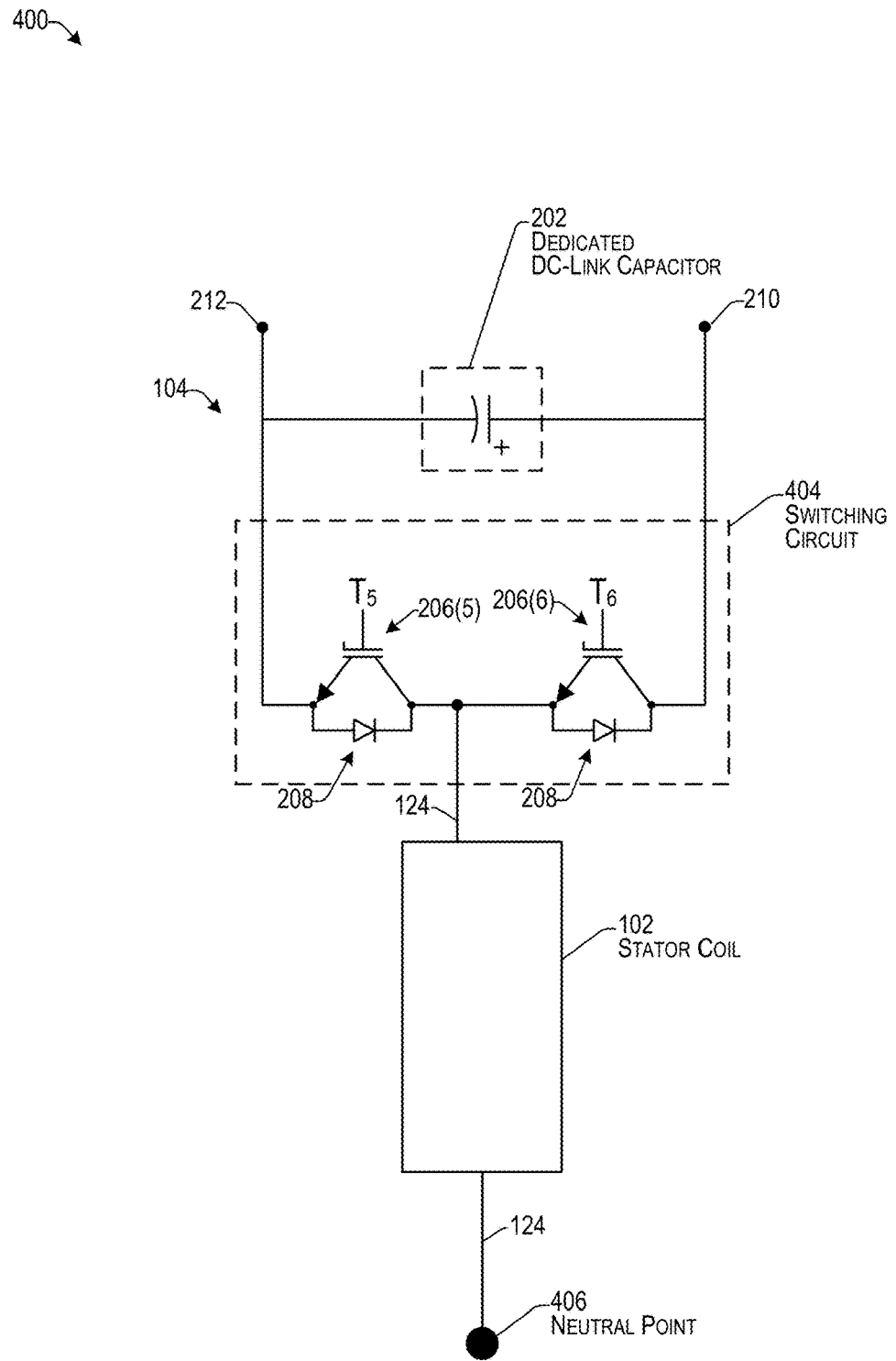
FIG. 4 illustrates an example configuration of a dedicated inverter circuit connected to a stator coil according to some implementations.

FIG. 4 illustrates an example configuration 400 of a dedicated inverter circuit 104 connected to a stator coil 102 according to some implementations. The dedicated inverter circuit 104 includes a DC-link capacitor 202, as discussed above, and a switching circuit 404. As mentioned above, the DC-link capacitor 202 may serve as a fast-response energy-storage device that may help stabilize the DC voltage supplied to the switching circuit 404. For example, the DC-link capacitor 202 may linearize the current drawn from the battery (not shown in FIG. 4), which may otherwise have high peaks that can reduce efficiency and battery life. The DC-link capacitor 202 may be positioned in close proximity to the switching circuit 404 to maximize the effectiveness of the DC-link capacitor 202.

The switching circuit 404 in this example forms a half-bridge inverter including two electronically controlled switches 206(5) and 206(6). As in the example of FIG. 2, the switches 206, in some cases, may be one of an IGBT or a MOSFET, either of which may be connected in parallel with a reversely connected diode 208, as is known in the art. A first side 210 of the dedicated inverter circuit 104 may connect to DC high-voltage received from a battery or other DC power source (not shown in FIG. 4). A second side 212 of the dedicated inverter circuit 104 may connect to a common return, a ground, or an otherwise neutral line (not shown in FIG. 4).

The switches 206(5) and 206(6) of the switching circuit 404 may receive control signals T5 and T6, respectively. As one example, the switches 206(5) and 206(6) may be controlled by the signals T5 and T6, respectively. to conduct in turns. For instance, the control signals T5 and T6 may be PWM signals generated by the controller 312, as discussed above with respect to FIG. 3, to generate appropriate output waveforms to drive the stator coil 102. For example, the waveform generated by the switching circuit 404 may be an imperfect or modified sine wave, such as a multiple step sinusoidal AC waveform. In other examples, the switching circuit 404 may generate a square wave, a perfect sine wave, or other AC waveform. Accordingly, implementations herein are not limited to any particular type of AC output for the dedicated inverter circuits 104.

Furthermore, in this example, one conductor end 124 of the stator coil 102 connects between the switches 206(5) and 206(6) of the switching circuit 404. The other conductor end 124 connects to a neutral point 406, such as a neutral line (not shown in FIG. 4) that may be connected to a vehicle ground plane or the like.

Figure 5:
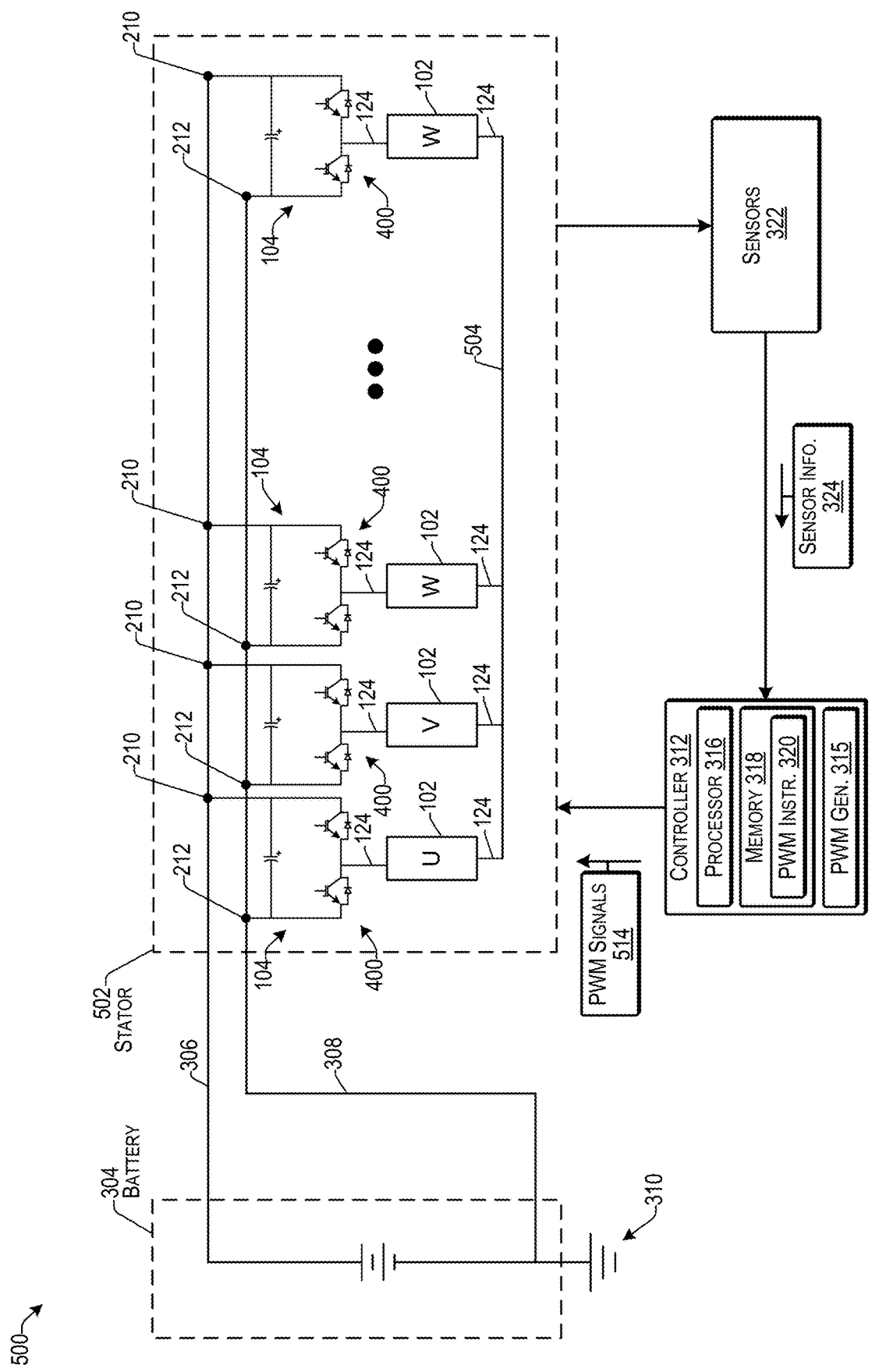
FIG. 5 illustrates an example circuit configuration of a stator including the dedicated inverter circuits of the configuration discussed above with respect to FIG. 4 according to some implementations.

FIG. 5 illustrates an example circuit configuration 500 of a stator 502 including the dedicated inverter circuits 104 of the configuration 400 discussed above with respect to FIG. 4 according to some implementations. In some examples, the stator 502 may correspond to the stator 100 discussed above with respect to FIG. 1. In the illustrated example, the battery 304 provides high voltage DC power through the line 306 to the first sides 210 of a plurality of the dedicated inverter circuits 104 having the configuration 400. In addition, a neutral line 308 connects to the second sides 412 of the plurality of dedicated inverter circuits 104 and returns to the battery 304 and/or a ground 310, which, in vehicular applications, may correspond to a vehicle ground plane and/or main ground such as the vehicle body, vehicle frame, vehicle chassis, or the like. Each of the dedicated inverter circuits 104 may receive the high voltage DC power through the line 306, and may convert the high voltage DC power to high voltage AC power that is provided to the respective stator coil 102 connected to the respective dedicated inverter circuit 104. Furthermore, as mentioned above, in this example, one conductor end 124 of each stator coil 102 connects between the switches of the switching circuit 404. The other conductor end 124 connects to a neutral line 504 that may be connected to a vehicle ground plane or the like.

The neutral line 504 may correspond to and/or may be equivalent to the neutral point 406 discussed above with respect to FIG. 4.

In addition, the controller 312 discussed above with respect to FIG. 3 is connected to the stator 502 for providing control signals to the plurality of dedicated inverter circuits 104 as discussed above with respect to FIG. 4. As mentioned above, e.g., with respect to FIG. 4, the controller 312 may send PWM signals 514 to the individual switches of the dedicated inverter circuits 104 to control the waveforms and the timing of the waveforms generated by the respective dedicated inverter circuits 104. The controller 312 may include the processor 316 and the memory 318 that may store PWM instructions, such as a PWM algorithm, executable by the processor 316 for generating the PWM signals 314 using the PWM generator 315, such as based on an input received from a speed controller (not shown) or the like.

In the example, of FIG. 5, the controller 312 may cause a first group of dedicated inverter circuits 104 to generate AC power according to a U phase, a second group of the dedicated inverter circuits 104 to generate AC power according to V phase, and a third group of the dedicated inverter circuits 104 to generate AC power according to a W phase. In some examples, there may be 24 total stator coils 102 and corresponding dedicated inverter circuits 104 such that there are eight dedicated inverter circuits 104 and stator coils 102 in each phase group. However, implementations herein are not limited to any particular number of stator coils 102 and corresponding inverter circuits 104.

In addition, similar to the example of FIG. 3 discussed above, the sensors 322 may sense a condition of each stator coil 102 of the plurality of stator coils 102, and may provide sensor information 324 to the controller 312. For instance, in response to detecting a short circuit in one of the stator coils 102, the sensors 322 may provide sensor information 324 to the controller 312. In response, the controller 312 may selectively control the power provided to individual ones of the stator coils 102, such as to compensate for a detected short circuit and/or to compensate for a detected eccentricity. In addition, in the case that a stator coil suffers a short circuit or fails entirely, the controller 312 is able to determine which stator coil has failed, and may report this failure to a vehicle computing device, to a vehicle passenger or vehicle operator, to a maintenance facility, or the like.

Figure 6:
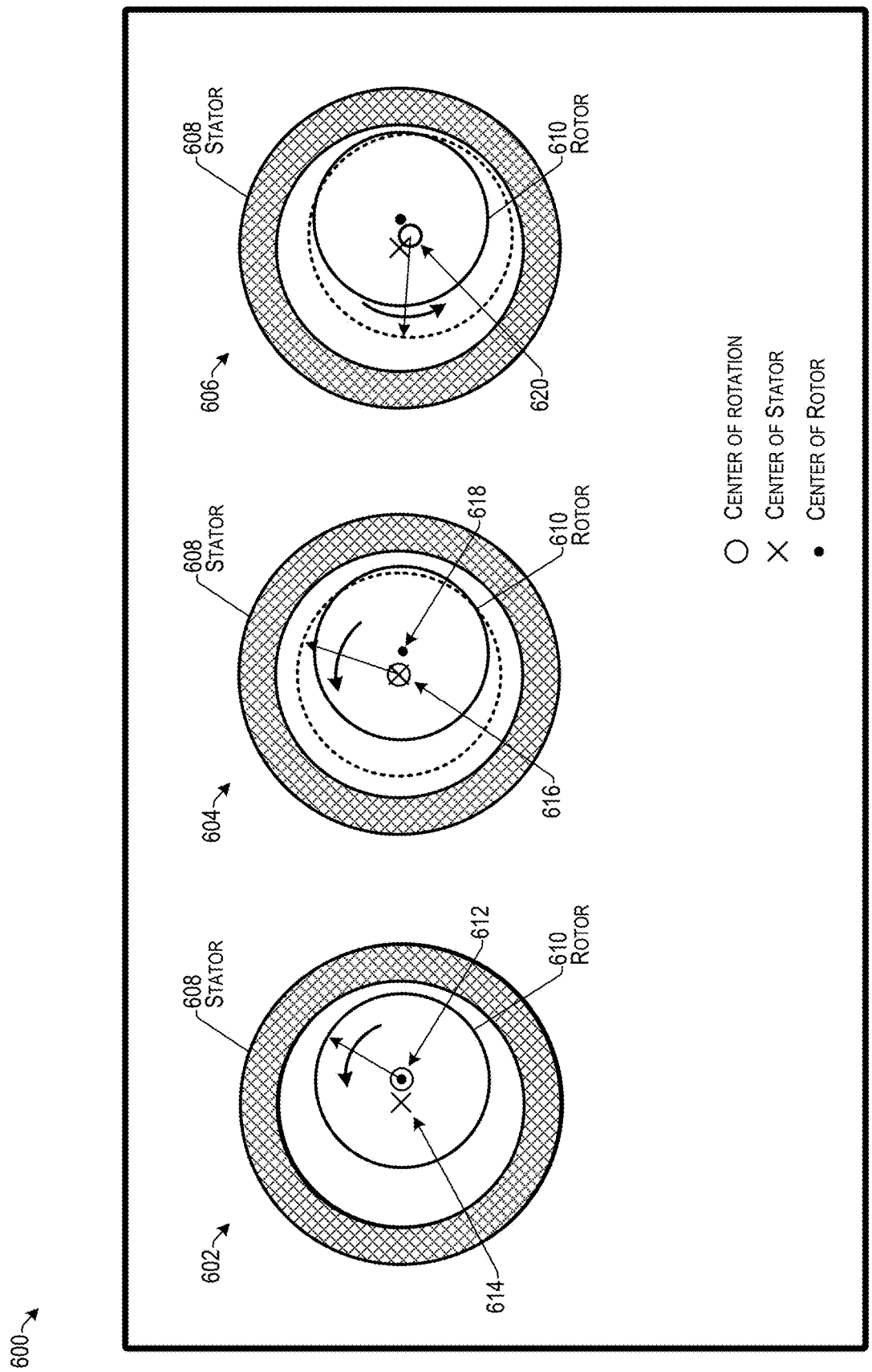
FIG. 6 illustrates examples of eccentricities that may be compensated for by the controller according to some implementations.

FIG. 6 illustrates examples 600 of eccentricities that may be compensated for by the controller 312 according to some implementations. A common issue with rotary electric machines is eccentricity. Eccentricity may be caused by a mechanical imperfection due to manufacturing variation or degradation of parts during usage of the rotary electric machine. Eccentricity may be categorized as static eccentricity 602, dynamic eccentricity 604, or mixed eccentricity 606. Eccentricity cannot be avoided entirely during mass production of rotary electric machines. For example, eccentricity may cause an unbalanced magnetic pull on the inner surface of the stator 608 by the magnets of the rotor 610, and therefore may cause unnecessary vibration, noise, torque ripples, and so forth.

Operating a rotary electric machine with an eccentricity may lead to inconsistent torque and/or may cause important components, such as bearings, to wear out prematurely. In a conventional system, after a rotary electric machine has been installed in a vehicle, there may be no easy way to mitigate the noise, vibration, and harshness (NVH) problem and/or torque pulsation. For instance, the electromagnetic field provided by the stator 608 may be always circularly symmetric, but eccentricity may cause an asymmetric air gap between the stator 608 and the rotor 610.

In the illustrated example, a first type of eccentricity that may exist between a stator 608 and a rotor 610 is referred to as static eccentricity 602. In the case of static eccentricity 602, the center of rotation coincides with the center of the rotor 610, as indicated at 612, but not with the center 614 of the stator 608. In addition, in the case of dynamic eccentricity 604, the center of rotation coincides with the center of the stator as indicated at 616, but not with center 618 of the rotor 610. Furthermore, in the case of mixed eccentricity 606, the center of rotation 620 does not coincide with the center of the stator 608, nor with the center of the rotor 610.

In some examples herein, the controller 312 may receive, from the sensors 322, sensor information 324 that indicates the voltage and injected current in each stator coil of the plurality of stator coils (not shown in FIG. 6) in the stator 608. Consequently, each stator coil may be considered as an eddy current sensor and the operating condition of the rotor 610, such as rotor position and eccentricity, may be determined and monitored using the principle of eddy current tomography. For instance, in the case of an eccentricity fault, each stator coil might have a different inductance value, such as due to non-uniform air gaps (e.g., static eccentricity 602), or may have dynamic inductance values that are synchronous with the revolution of the rotor 610 (e.g., dynamic eccentricity 604). For instance, the inductance values may be indicated based on determining a back electromotive force signal ("back EMF", also known as "counter electromotive force", "counter EMF", or "CEMF") for each stator coil. If the back EMF signal varies by more than a threshold amount among the plurality of stator coils, this may indicate an eccentricity. As one example, to compensate for detected eccentricity, the PWM signals fed to each dedicated inverter may be adjusted, such to correct a non-uniform air gap by gradually increasing the amount of current delivered to coils adjacent to a larger air gap and gradually decreasing the amount of current delivered to coils adjacent to a smaller gap until any NVH and torque ripples are mitigated.

Figure 7:
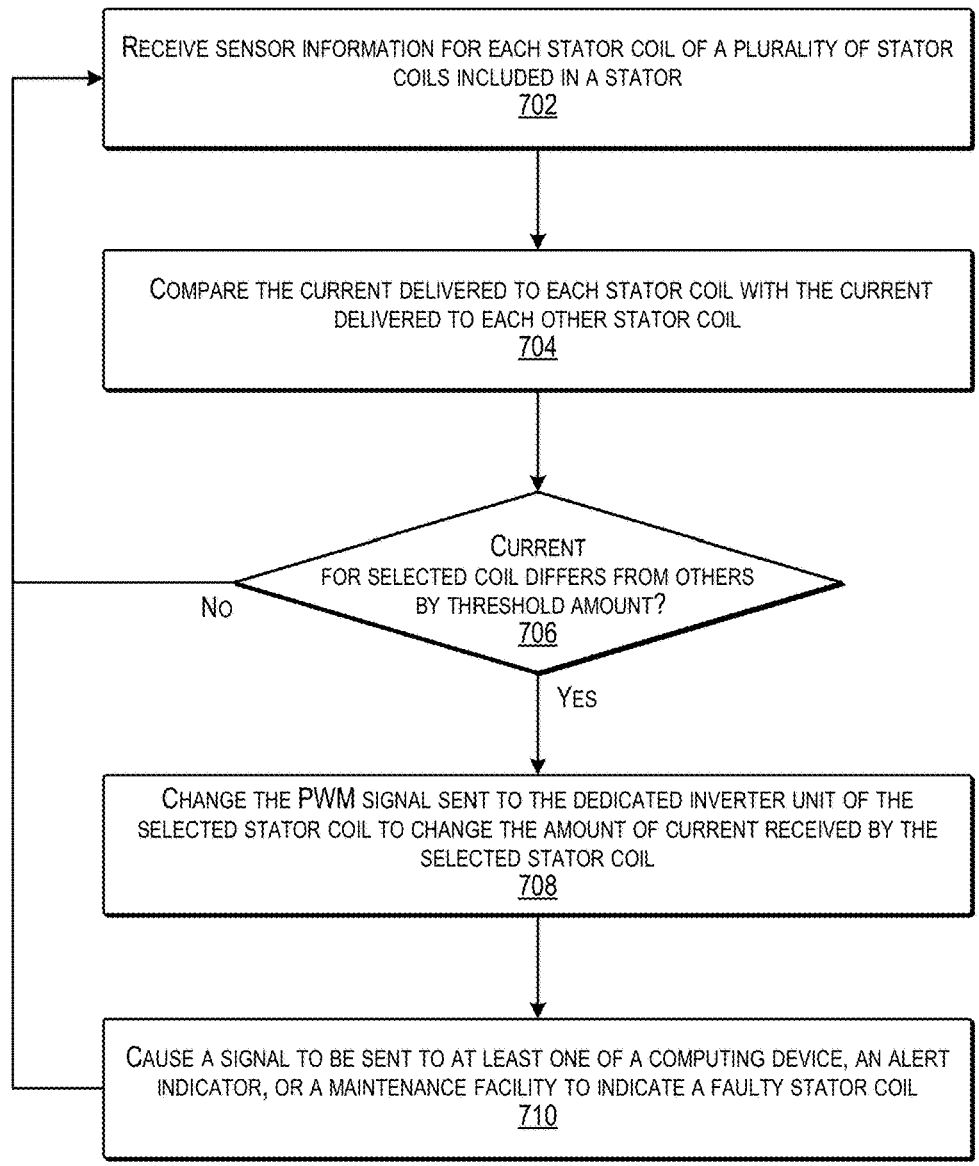
FIG. 7 is a flow diagram illustrating an example process for detecting and compensating for a faulty stator coil according to some implementations.
Figure 8:
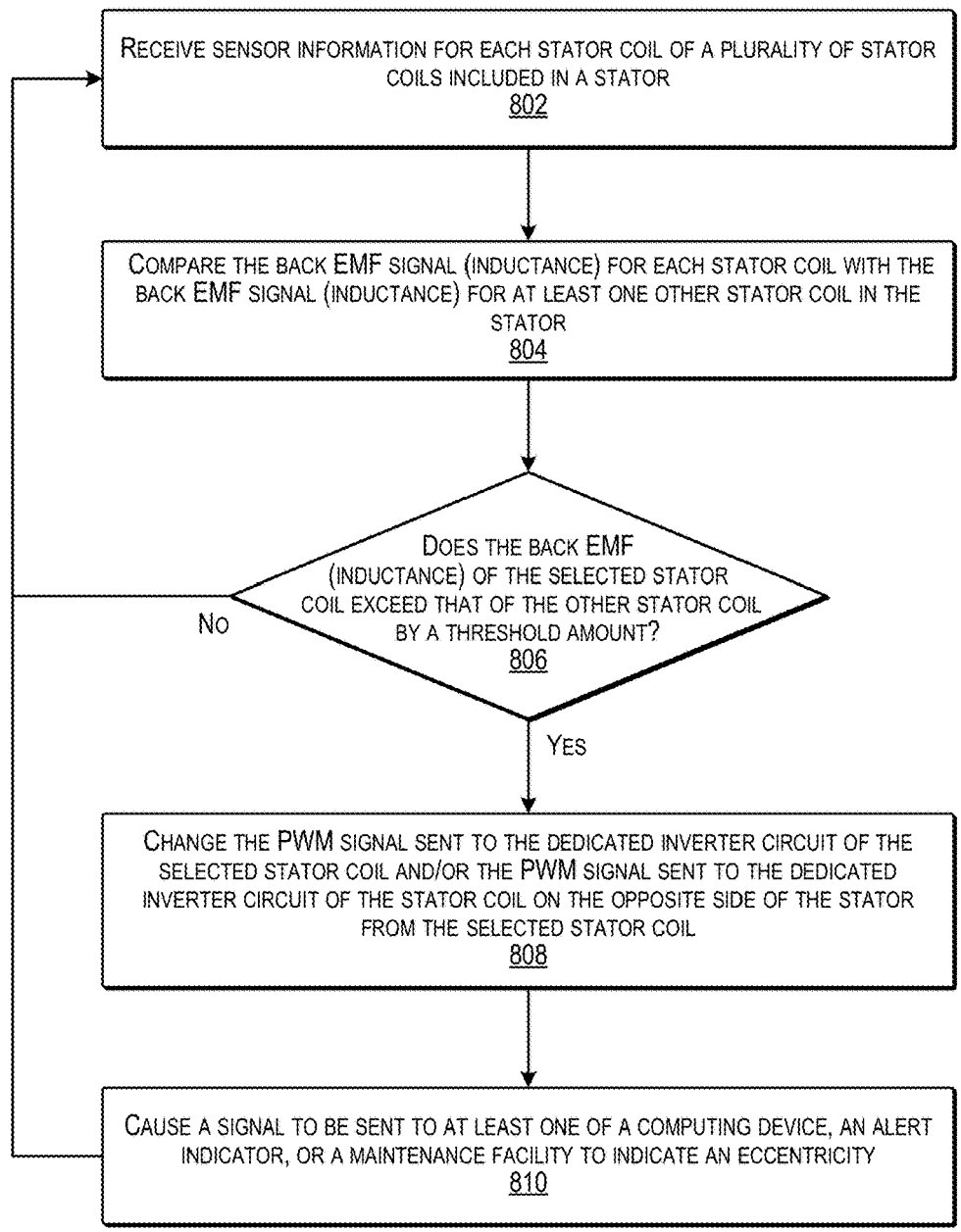
FIG. 8 illustrates an example process for detecting and compensating for an eccentricity according to some implementations.

FIGS. 7 and 8 are flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent processor-executable instructions stored on memory or other computer-readable media that, when executed by a processor, configures the processor to perform the recited operations. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems, and devices described in the examples herein, although the processes may be implemented in a wide variety of other environments, systems, and devices.

FIG. 7 is a flow diagram illustrating an example process 700 for compensating for a faulty stator coil according to some implementations. In some examples, the process 700 is executed by the controller 312 discussed above with respect to FIGS. 2-5, such as by execution of the PWM instructions or other suitable algorithms.

As mentioned above, in vehicle powertrain applications, it is desirable for a rotary electric machine to be highly reliable. For instance, autonomous vehicles may have increased durability and functional safety requirements since, if a fault occurs in an electric motor, the passengers of the autonomous vehicle may be exposed to increased risks. One of the more common faults in rotary electric machines is a short circuit in a stator coil. A short-circuit fault may mean that the conductor of the stator coil is either shorted to ground or shorted to another conductor, such as due to insulation failure. For instance, this may occur due to hazardous operation conditions (e.g., high temperature, high voltage) and corresponding high insulation pressure. A short-circuit fault may provide a path of lower resistance and a large amount of current may pass through the short circuit, which can create a hot spot in the shorted stator coil. This can cause motor control problems, and may also progress to complete powertrain breakdown as the shorted stator coil continues to heat up.

Furthermore, in a conventional system, once a short-circuit fault occurs at one of the stator coils, all coils of the same phase may be affected because they are all connected to the same bus-rings. Thus, a large amount of current may be conducted through the shorted stator coil and smaller currents may be conducted through the other stator coils of the same phase. This results in imbalanced currents in the stator coils of that phase, and can generate excessive heat and loss of efficiency. For example, as the amount of current increases, heat generation at the shorted coil is increased, which leads to more severe thermal pressure and accelerated insulation degradation, which may cause complete motor malfunction in some cases. Further, if the short circuit is detected and the whole phase is disconnected from receiving current, one third of the torque capability of the electric motor may be lost.

On the other hand, in implementations herein, when a short circuit is detected in one of the stator coils in a stator having a plurality of coil segments for each phase, the current delivered to just the shorted coil segment may be reduced. For instance, because the controller is able to control each stator coil individually using PWM signals, the PWM algorithm executed by the controller may automatically adjust the amount of current delivered to a particular stator coil to adapt to resistance and inductance changes detected in the particular stator coil. Accordingly, the examples herein may effectively reduce the current delivered to the shorted stator coil by individually controlling the drive signal of the shorted coil and thus, may contain the fault locally. This also prevents thermal failure progression from heat accumulation, and may avoid complete motor breakdown.

At 702, the controller may receive sensor information for each stator coil of a plurality of stator coils included in a stator. For example, the sensor information may include an indication of an amount of current delivered to each coil through a respective controllable dedicated inverter circuit associated with each stator coil, respectively.

At 704, the controller may compare the current delivered to each stator coil with the current delivered to each other stator coil in the stator.

At 706, the controller may determine whether an amount of current received by a selected one of the stator coils exceeds the current received by the other stator coils by a threshold amount. If so, the process goes to 708. If not, the process goes back to 702.

At 708, the controller may change the PWM signal sent to the dedicated inverter unit of the selected stator coil to reduce the amount of current received by the selected stator coil.

At 710, the controller may at least one of send a signal or otherwise cause a signal to be sent to at least one of a computing device, an alert indicator, or a maintenance facility to indicate that a faulty stator coil has been determined in the stator. For instance, the controller may send a signal to a vehicle computing device, such as an electronic control unit, which may in turn notify a vehicle occupant, notify a vehicle control program, notify a maintenance facility or the like. In other examples, the controller itself may provide any of the above mentioned notifications. The process may then return to 702 to receive additional sensor information to determine whether to make additional changes to the PWM signal. Numerous other variations will be apparent to those of skill in the art having the benefit of the disclosure herein.

FIG. 8 illustrates an example process 800 for detecting and compensating for an eccentricity according to some implementations. In some examples, the process 800 is executed by the controller 312 discussed above with respect to FIGS. 2-5, such as by execution of the PWM instructions or other suitable algorithms.

As mentioned above, eccentricity is a commonly seen defect in manufacturing of rotary electric machines. Examples of the symptoms of eccentricity may include an imbalanced air gap, an imbalanced magnet circuit, an imbalanced current, an imbalanced torque at different rotor positions, and excess torque ripple, noise, and vibration.

In some examples herein, the stator coils may each be individually monitored to determine a back electromotive force signal ("back EMF", also known as "counter electromotive force", "counter EMF", or "CEMF") for each stator coil for detecting any eccentricity. For instance, the back EMF signal is indicative of the electromotive force or "voltage" that opposes a change in the current that induced the EMF and may be indicative of an inductance of the respective stator coil. In the examples herein, each stator coil may be individually monitored and controlled. Accordingly, the controller 312 is able to keep track of the rotor position and compensate for any detected eccentricity. When properly compensated with an asymmetric PWM control signal, at least some torque ripple and vibration due to eccentricity can be reduced.

At 802, the controller may receive sensor information for each stator coil of a plurality of stator coils included in a stator. For example, the sensor information may include an indication of an amount of back EMF (inductance) for each coil, respectively.

At 804, the controller may compare the back EMF (inductance) for each stator coil with the back EMF signal (inductance) for at least one other stator coil in the stator. In some cases, the controller may compare the back EMF signals of stator coils on opposite sides of the stator from each other.

At 806, the controller may determine whether the back EMF (inductance) of a selected one of the stator coils exceeds the back EMF (inductance) of the at least one other stator coil by a threshold amount. If so, the process goes to 808. If not, the process goes back to 802.

At 808, the controller may change the PWM signal sent to the dedicated inverter circuit of the selected stator coil and/or the PWM signal sent to the dedicated inverter circuit of the stator coil on the opposite side of the stator from the selected stator coil. The PWM signal may be controlled to change the amount of current delivered to one or more of the stator coils to thereby help reduce the torque ripple or NVH that may be caused by an eccentricity For example, the PWM signal might be changed to both stator coils to increase the pulling force applied to one side of the rotor and to reduce the pulling force applied to the opposite side of the rotor.

At 810, the controller may at least one of send a signal or otherwise cause a signal to be sent to at least one of a computing device, an alert indicator, or a maintenance facility to indicate that an eccentricity has been detected in the rotary electric machine. For instance, the controller may send a signal to a vehicle computing device, such as an electronic control unit, which may in turn notify a vehicle occupant, notify a vehicle control program, notify a maintenance facility, or the like. In other examples, the controller itself may provide any of the above mentioned notifications. The process may then return to 802 to receive additional sensor information to determine whether to make additional changes to the PWM signals. Numerous other variations will be apparent to those of skill in the art having the benefit of the disclosure herein.

The example processes described herein are only examples of processes provided for discussion purposes. Numerous other variations will be apparent to those of skill in the art in light of the disclosure herein. Additionally, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art. Further, various instructions, methods, and techniques described herein may be considered in the general context of processor-executable instructions stored on computer-readable media, such as a memory, and executable by a processor or the like.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A rotary electric machine comprising:
   a stator including a plurality of stator coils arranged in a circular pattern around a central opening configured for receiving a rotor;
   a respective dedicated inverter circuit associated with each respective stator coil, each respective dedicated inverter circuit configured to convert direct current power to alternating current power to provide to the respective stator coil; and
   a controller, the controller configured to perform operations comprising:
      receiving sensor information for each stator coil of the plurality of stator coils, the sensor information indicating an inductance of each stator coil;
      comparing the inductance of a first selected stator coil with the inductance of a second selected stator coil located across the central opening from the first selected stator coil;
      determining that the inductance of the first selected stator coil differs from the inductance of the second selected stator coil by a threshold amount indicating an eccentricity; and
      changing a signal sent to the respective dedicated inverter circuit of at least one of the first selected stator coil or the second selected stator coil to change an amount of current delivered to the at least one of the first selected stator coil or the second selected stator coil to reduce the eccentricity.

2. The rotary electric machine as recited in claim 1, wherein each respective dedicated inverter circuit includes a respective switching circuit.

3. The system as recited in claim 2, wherein the respective switching circuit includes four switches actuated based on signals received from the controller.

4. The rotary electric machine as recited in claim 2, wherein:
   the respective switching circuit includes two switches actuated based on signals received from the controller;
   a first conductor end of a respective stator coil connects between the two switches; and
   a second conductor end of the respective stator coil connects to at least one of a neutral line or ground.

5. The rotary electric machine as recited in claim 1, wherein the controller is further configured to perform operations comprising:
   receiving additional sensor information for each stator coil of the plurality of stator coils, the additional sensor information indicating an amount of current delivered to each stator coil;
   determining that an amount of current delivered to a selected stator coil of the plurality of stator coils differs by a threshold amount from an amount of current delivered to at least one other stator coil of the plurality of stator coils indicating a short circuit in the selected stator coil; and
   changing a signal sent to the respective dedicated inverter circuit of the selected stator coil to change the amount of current delivered to the selected stator coil.

6. The rotary electric machine as recited in claim 5, the operations further comprising causing a signal to be sent to at least one of a computing device, an alert indicator, or a maintenance facility to indicate a faulty stator coil.

7. The rotary electric machine as recited in claim 1, the operations further comprising causing a signal to be sent to at least one of a computing device, an alert indicator, or a maintenance facility to indicate the eccentricity.

8. A method comprising:
   receiving, by a controller, sensor information for each stator coil of a plurality of stator coils included in a stator, the sensor information indicating an inductance of each stator coil of the plurality of stator coils, each stator coil connected to a respective dedicated inverter circuit, the plurality of stator coils arranged in a circular pattern around a central opening configured for receiving a rotor;
   comparing the inductance of a first selected stator coil with the inductance of a second selected stator coil located across the central opening from the first selected stator coil;
   determining that the inductance of the first selected stator coil differs from the inductance of the second selected stator coil by a threshold amount indicating an eccentricity; and
   based at least on determining the eccentricity, changing a signal sent to the respective dedicated inverter circuit of at least one of the first selected stator coil or the second selected stator coil to change an amount of current delivered to the at least one of the first selected stator coil or the second selected stator coil to reduce the eccentricity.

9. The method as recited in claim 8, further comprising:
receiving additional sensor information that indicates an amount of current delivered to each stator coil;
determining that an amount of current delivered to a selected stator coil differs by a threshold amount from an amount of current delivered to at least one other stator coil of the plurality of stator coils indicating a short circuit in the selected stator con; and
changing the signal sent to the respective dedicated inverter circuit of the selected stator coil to cause a change to the amount of current delivered to the selected stator coil.

10. The method as recited in claim 9, further comprising causing a signal to be sent to at least one of a computing device, an alert indicator, or a maintenance facility to indicate a faulty stator coil.

11. The method as recited in claim 8, further comprising causing a signal to be sent to at least one of a computing device, an alert indicator, or a maintenance facility to indicate the eccentricity.

12. The method as recited in claim 8, wherein the signal includes a pulse width modulation signal that controls a switching circuit included in each respective dedicated inverter circuit.

13. A rotary electric machine comprising:
a stator including plurality of stator coils arranged around a central opening configured for receiving a rotor;
a respective dedicated inverter circuit associated with each respective stator coil, each respective dedicated inverter circuit including a switching circuit configured to convert direct current power to alternating current power to provide to the respective stator coil, each respective dedicated inverter circuit further including a dedicated direct-current (DC)-link capacitor for stabilizing DC voltage supplied to the switching circuit of the respective dedicated inverter circuit; and
a controller, the controller configured to perform operations comprising:
receiving sensor information for each stator coil of the plurality of stator coils, the sensor information indicating an inductance of each stator coil;
comparing the inductance of a first selected stator coil with the inductance of a second selected stator coil located across the central opening from the first selected stator coil;
determining that the inductance of the first selected stator coil differs from the inductance of the second selected stator coil by a threshold amount indicating an eccentricity; and
changing a signal sent to the respective dedicated inverter circuit of at least one of the first selected stator coil or the second selected stator coil to change an amount of current delivered to the at least one of the first selected stator coil or the second selected stator coil to reduce the eccentricity.

14. The rotary electric machine as recited in claim 13, wherein the respective switching circuit includes four switches actuated based on signals received from the controller.

15. The rotary electric machine as recited in claim 13, wherein:
the respective switching circuit includes two switches actuated based on signals received from the controller;
a first conductor end of the respective stator coil connects between the two switches; and
a second conductor end of the respective stator coil connects to at least one of a neutral line or ground.

16. The rotary electric machine as recited in claim 13, wherein the controller is further configured to perform operations comprising:
receiving additional sensor information for each stator coil of the plurality of stator coils, the additional sensor information indicating an amount of current delivered to each stator coil;
determining that an amount of current delivered to a selected stator coil of the plurality of stator coils differs by a threshold amount from an amount of current delivered to at least one other stator coil of the plurality of stator coils indicating a short circuit in the selected stator coil; and
changing a signal sent to the respective dedicated inverter circuit of the selected stator coil to change the amount of current delivered to the selected stator coil.

17. The rotary electric machine as recited in claim 16, the operations further comprising causing a signal to be sent to at least one of a computing device, an alert indicator, or a maintenance facility to indicate a faulty stator coil.

\* \* \* \* \*